United States Patent
Schramm et al.

[11] 3,814,540
[45] June 4, 1974

[54] HELICOPTER ROTOR BLADE

[76] Inventors: Buford J. Schramm, 14805 S. Interstate 10, Tempe, Ariz. 85281; Robert G. Everts, Tempe, Ariz.

[22] Filed: Jan. 27, 1972

[21] Appl. No.: 221,370

[52] U.S. Cl. .............................. 416/226, 416/144
[51] Int. Cl. ............................................ B64c 27/46
[58] Field of Search ................... 416/226, 144, 233

[56] References Cited
UNITED STATES PATENTS

| | | | |
|---|---|---|---|
| 2,199,035 | 4/1940 | Allen | 416/144 |
| 2,630,868 | 3/1953 | Ellenberger | 416/144 |
| 2,771,144 | 11/1956 | Lasserre et al. | 416/144 |
| 2,950,766 | 8/1960 | Huber | 416/226 |
| 3,004,607 | 10/1961 | Linnabery et al. | 416/226 |
| 3,055,437 | 9/1962 | Stack | 416/226 |
| 3,103,977 | 9/1963 | Negroni | 416/226 X |
| 3,144,907 | 8/1964 | Lubben et al. | 416/226 X |
| 3,167,129 | 1/1965 | Shultz | 416/226 |

*Primary Examiner*—Everette A. Powell, Jr.
*Attorney, Agent, or Firm*—Donald D. Mon

[57] ABSTRACT

A helicopter rotor blade having a simple and economical construction which includes internal counterweight means to shift the center of gravity to a forward location. A skin is wrapped around a former which has opposed top and bottom surfaces. The former cradles the counterweight member at the leading edge of the blade. The specific gravity of the counterweight member is greater than that of the former, and the trailing edges of the skin are joined together to close out the blade. The skin may be attached to the former by conventional shanked fasteners, or by resilient bonding means. The counterweight member may be pinned to the former to hold the blade together in the unlikely event of its fatigue failure.

1 Claim, 4 Drawing Figures

PATENTED JUN 4 1974 3,814,540
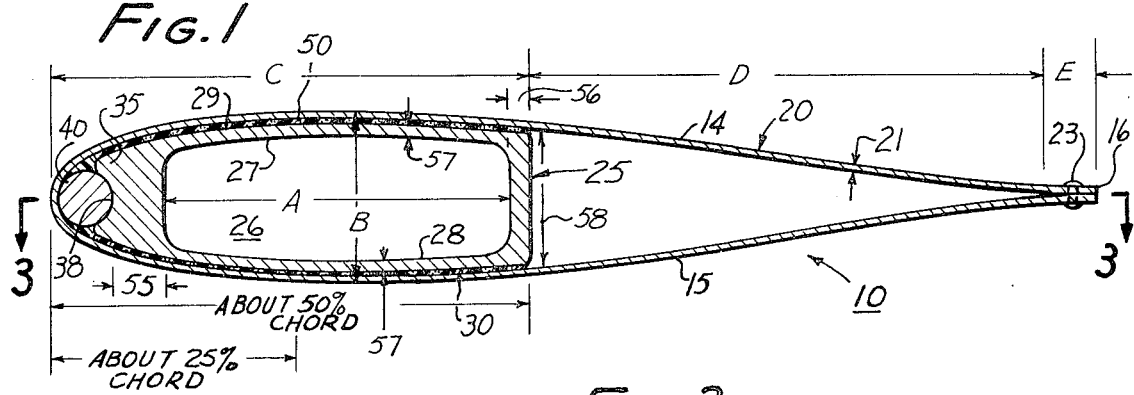
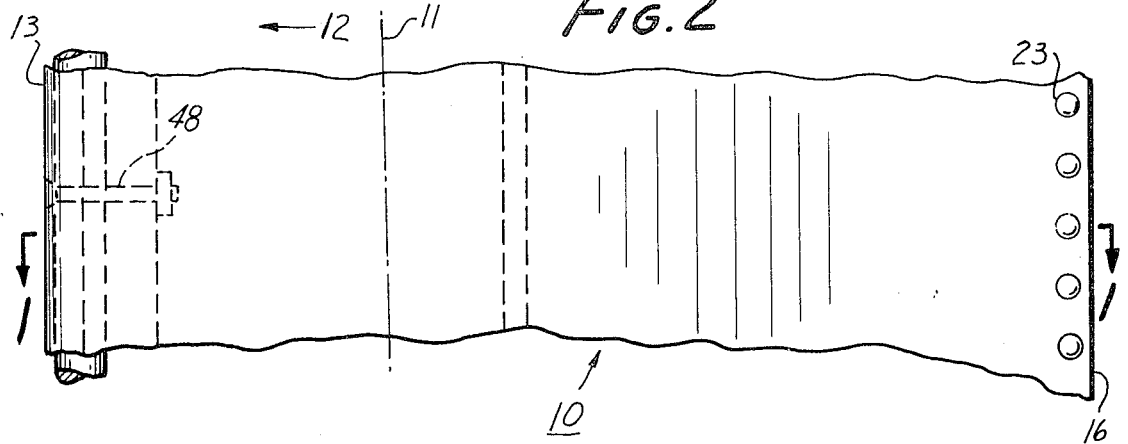
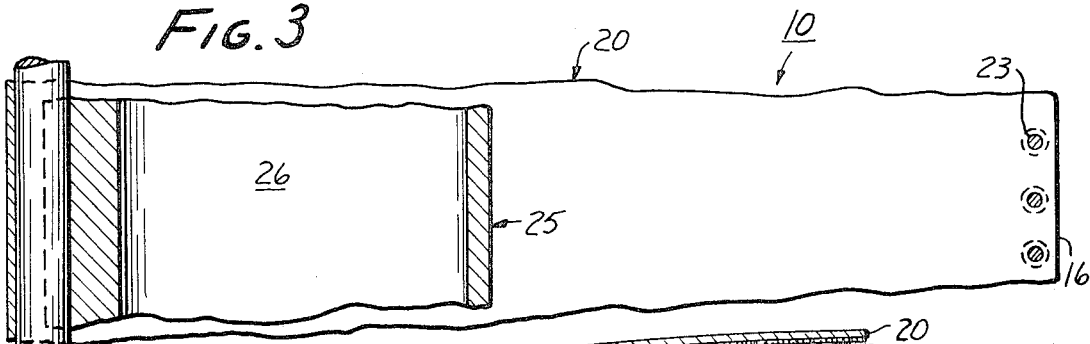
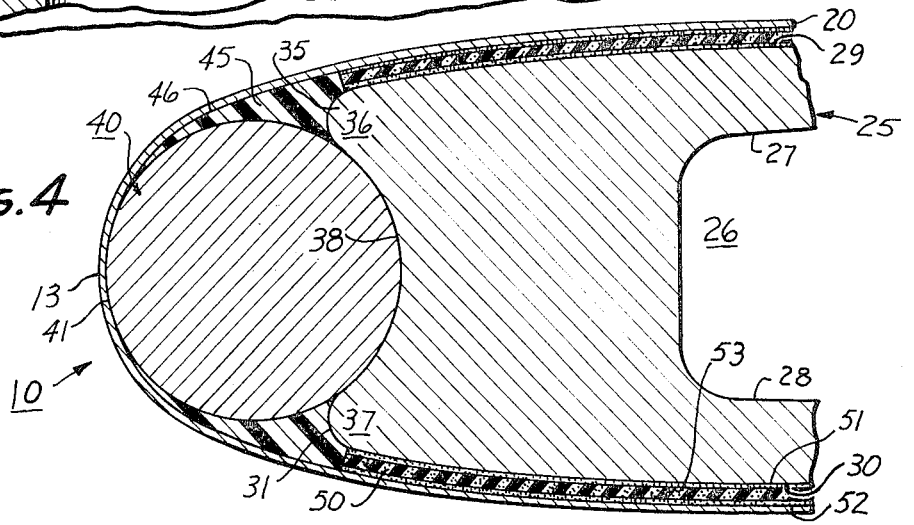

HELICOPTER ROTOR BLADE

This invention relates to helicopter rotor blades.

Helicopter rotor blades are very expensive, and their initial and replacement costs constitute an economic barrier to the usage of helicopters in many fields where there is a potential market. One such market is that of privately-owned helicopters to be used for personal pleasure. It is not at all unusual, in fact it is the usual event, for conventional helicopter rotor blades to cost upwardly of several thousand dollars per set of two blades. These blades are rated for at least several thousand hours of life in order to justify their cost, it being the objective to secure a blade set whose cost is on the order of one dollar or so per flight hour. However, the design for such long life is not as desirable as it may at first appear. In fact, it is an unnecessary economic burden.

Whatever the design life span may be, the blade must be fully safe and reliable for that full time — it cannot be only partially reliable. Therefore, the safety of the blade is not a variable in selecting a design. If all other variables were equal, a shorter life span would be selected rather than a longer life span. This is for the reason that accidents often happen to rotor blades, even within a very few hours of their installation, and very frequently within several thousand hours of operation, and the operator must then scrap a blade with a large undepreciated value if the life span is a long one. It would be much better to scrap a blade with a lesser initial cost, and a lesser unused life.

With the state of the art of known rotor blades, the option of a shorter design life span is not available. This is because their construction is inherently so expensive that, in order for them to be at all practical, they must at least have the potential of a long life, even though an individual set stands a relatively poor chance of surviving to its full design life. As a consequence, helicopters are often used sparingly to save on the cost of blades, and many persons do not use helicopters at all for the same reason.

This invention takes a sharp departure from conventional blade construction, and in so doing, can produce an inexpensive blade which sharply reduces the realistically calculated cost per hour of helicopter flight by reducing the cost per hour of the blades. It produces a blade having a shorter design life, during which the blade is totally safe, and attains the advantages, not only of a lesser out-of-pocket cost, but also the advantage that, in the event of premature mishap, there is less money lost than when a set of conventional blades must be scrapped with the elapsed same flight time.

This invention thereby makes the operation of a helicopter economically more feasible. No longer need helicopters be used sparingly because of the high averaged-out cost per hour of costly rotor blades. Blades according to this invention can, at 1972 price levels, be sold to the user at about $1,000.00 per set of two blades. Their design life is on the order of 500 to 1,000 hours. A comparable conventional set of two blades will cost on the order of about $4,000.00, and have a design life on the oder of perhaps 3,000 hours, which they do not usually attain.

In attaining the foregoing economic advantages, blades according to this invention also enjoy other advantages. One is a favorable forward disposition of the center of gravity of the blade without any penalty of increase in weight. Another is an improved cleanliness of airfoil line and surface. Another is a positive retention of the blade in the unlikely event of its fatigue failure. Still another is a simplicity of construction which leads to remarkable reliability and repetitiveness in manufacture. Blades made according to this invention can readily be matched in sets with very little modification or adjustment, in sharp contrast to the extensive work which must be done to match conventional blades into sets.

A helicopter rotor blade according to this invention has an airfoil configuration, including a longitudinal axis, an axially-extending leading edge, a top and a bottom surface, and a trailing edge. An axially-extending former has opposed surfaces which extend laterally relative to the longitudinal axis, which surfaces are geometrically similar to the respective adjacent airfoil surface. The edge of the former nearest to the leading edge has retainer means which retains an axially-extending counterweight member. The wall of the counterweight member adjacent to the skin is geometrically similar to the adjacent portion of the airfoil. The airfoil surface is formed by drawing the skin around and against the former and against the counterweight member, and then fastening the edges of the skin together at its trailing edge. The skin is attached to the former, preferably, but not necessarily, by an adhesive, which may also have an elastic property.

According to a feature of this invention, the specific gravity of the counterweight member is greater than the specific gravity of the former, whereby the center of gravity is shifted toward the leading edge to a point forwardly of where it would have been had the counterweight and former been made of the same material.

According to a preferred but optional feature of the invention, the former comprises a continuous extrusion having a central open passage, the retainer means comprises a continuous channel in which the counterweight member is retained, and the counterweight member is a cylindrical rod.

The above and other features of this invention will be fully understood from the following detailed description and the accompanying drawings in which:

FIG. 1 is a cross-section of the presently preferred embodiment of the invention taken at line 1—1 in FIG. 2;

FIG. 2 is a top view of FIG. 1;

FIG. 3 is a view, partially in cutaway cross-section, taken at line 3—3 in FIG. 1; and FIG. 4 is an enlarged fragment of FIG. 1.

In FIG. 1 there is shown a helicopter rotor blade 10 according to the invention. It has an external airfoil configuration, which typically might be that of the well-known NACA 0015 or 0012. Other airfoil configurations may also be constructed by means of this invention, these being given by way of example. The blade has a longitudinal axis 11 directed outwardly from the hub (not shown) to which it is attached, a direction of forward motion 12 which extends normally to the longitudinal axis, a leading edge 13, a top and a bottom surface 14, 15, respectively, and a trailing edge 16.

A metal sheet constitutes skin 20 (sometimes called a "skin sheet"). The skin forms the airfoil. The skin has a dimension of thickness 21, and is wrapped as a unitary sheet to form the airfoil. At the trailing edge 16 of the airfoil, the edges of the sheet are held together by joiner means, which may comprise a bonding agent (not shown) such as cement or glue. Rivets 23 may be used instead of, or in addition to, the bonding agent.

An axially extending former 25 is provided, preferably in the form of a continuous extrusion. It has an axially extending central open passage 26 through its central portion, and includes a pair of oppositely facing walls 27, 28 which have top and bottom surfaces 29, 30, respectively. These surfaces 29 and 30 extend laterally relative to axis 11, and differ from the airfoil surface by the thickness of the skin member, and of the thickness of any intervening materials which may be used, as in FIGS. 1 and 4. Surfaces 29 and 30 are, therefore, geometrically similar to the outer surface of the skin (i.e., of the airfoil).

Retainer means 35 is provided at the leading edge 31 of the former. This retainer means, in its preferred embodiment, comprises an integral portion of a continuous extrusion, and includes flanges 36, 37 which form between them a curved embracing channel 38. The outer surfaces of the flanges form continuations of top and bottom surfaces 29 and 30.

An axially extending counterweight member 40 is fitted into the retainer means. It is closely embraced and cradled by the flanges. Contact throughout about 120° of the external surface of member 40 is preferred. The counterweight member is preferably a cylindrical rod. Its outer surface 41 is contiguous to the skin at the leading edge, and this surface forms (the word "form" being used in the sense of "shaping") the forward portion of the leading edge. Should other than a circular arc be desired at this point, the cross-section of member 40 would be appropriately modified. That portion of the counterweight member which shapes part of the leading edge is geometrically similar to the part which it shapes.

It will now be seen that, with the counterweight member placed in the retainer means, the skin may be wrapped to its final shape around the counterweight member and the former, and joined at the trailing edge by joinder means 23.

Additional details of the presently-preferred embodiment are shown in FIG. 4. The space 45 bounded by the former, the skin, and the counterweight member is filled with a bonding agent 46, which is preferably an epoxy, the value of whose thermal coefficient of expansion lies between that of the materials surrounding it. It serves to bond the counterweight member to the former, and to make a rigid backing for the skin which abuts it. If desired, a film of this material may also be present between the counterweight member and the former inside the retainer means. Bonding agent 46 does provide for at least some transfer of centrifugal load from the former to the counterweight member, although the mounting of the blade is primarily by attachment of the former to the rotor.

The fatigue properties of the counterweight member are usually better than those of the former, because the counterweight member, being provided for its greater specific gravity, will usually be a ferrous alloy, while the former will usually be an aluminum alloy. Advantage is taken of this feature by anchoring the counterweight member to the rotor hub, and pinning the former to the counterweight member by a pin 48 (FIG. 2) and nut or by some other form of structural joinder such as a screw whereby, should the former fail, it will be held to the counterweight member, and will not fly off the rotor. Pins 48 may be provided wherever desired for this purpose. The bonding agent 46 also assists this retention.

The counterweight member is not counted on for bending or torsional strength — its primary function is that of counterweight and of centrifugal retention in emergencies. Further, it is preferably not bonded to the skin at the forward edge — contact between the skin and the counterweight over an arc of perhaps 100° is maintained as a true abutting and non-bonded fit.

Bending and torsion forces are transferred from the skin primarily to the former, acting as a spar. For this purpose, the skin is attached to the former. One way of doing this is by rivets or threaded fasteners, but then bending and twisting of the blade will result in wrinkling of the airfoil and a reduction in its efficiency. While this is a useful means of attachment, the preferred means is that of bonding, which may be done by a single layer of adhesive.

Greatly improved properties are achieved if the bonding means which joins the skin to the former has elastic properties. Furthermore, the assembly technique is also simplified. With an elastic property, shear movement can take place between the former and the skin which will reduce the tendency to wrinkle. Such a construction is shown in FIGS. 1 and 4, wherein a tape 50 is placed between the skin and the former. Tape 50 is double-faced, with an adhesive layer 51, 52 on each side which will adhere to the adjacent blade member. The intermediate layer 53 is preferably an elastic neoprene foam. A suitable tape for this purpose is sold by The Industrial Tape Division of Minnesota Mining and Manufacturing Company under its trademark "Y 9122 Scotch Mount Brand High Strength Double Coated Foam Tape." This tape elastically binds together the skin and the former. Because the foam of which layer 53 is made is a neoprene foam, it is inherently spongy and volumetrically compressible. A piece of solid neoprene is not volumetrically compressible. It is resilient and applied forces can distort it, but its volume remains unchanged. However, a foam has voids whose volume can readily be changed by applied forces, and the total foam body can therefore change volume under applied, compressive forces. As a consequence, the foam layer can not only respond resiliently between the skin sheet and the former, but can locally change its volume, whereby to enable the skin sheet to remain smooth, even over localized irregularities.

In a helicopter rotor blade, it is best for the center of gravity to be located at about 25 percent of the chord rearwardly from the leading edge. It is also desirable for the inside of the blade to be void over the extent of about the trailing 50 percent of the chord. This is difficult to attain in conventional blades. However, in this invention, it is readily attainable. This is done by making the counterweight member of a material whose specific gravity is greater than that of the specific gravity of the former, and also by making the leading edge of the former thicker than its trailing edge, as can be shown by a comparison of dimensions 55 and 56. As convenient materials of construction, the skin sheet may be aluminum, 0.030 inch thick, the former may be made of 6061T6 aluminum, and the counter-weight member may be made of cold-roller steel rod. The specific gravity of the steel rod is approximately 7.5, and that of the aluminum alloy is approximately 2.7.

The construction shown in the following table of dimensions in inches will provide a NACA 0015 foil with its center of gravity rearwardly of the leading edge by 25 percent with the chord width.

A: 2½   Diameter of counterweight member: 7/16
B: 1-11/16   55: ¼
C: 3⅜   56: ⅛
D: 3½   57: ⅛
E: ¾   58: 1.0

By virtue of the use of the steel rod, the center of gravity is moved forward to the one-fourth chord location without increasing the mass of the blade. It is well known that increasing the mass is unfavorable to the longevity and performance of a rotor blade.

This construction enables an additional advantage to be attained, because by relative shear motion between the top and bottom surfaces of the skin at the trailing edge prior to joining them at the trailing edge and to the former, the camber of the blade can be adjusted.

The retainer means may be discontinuous if desired, but this will not usually be the case because it is desired to move as much mass toward the leading edge as possible. The dimensions of the central passage along the extrusion are selected with due regard to the strength required for the blade and will, in general, be minimized. The lateral lengths of the external surfaces of the extrusion will be made as short as possible, it generally being desired for the extrusion to terminate rearwardly from the leading edge by a distance no greater than about 50 percent of the chord.

An examination of the drawings in view of the foregoing specification will indicate that, in significant contrast with prior art blades made of metal or combinations of wood and metal, the blade can be formed from an inexpensive extrusion and steel rod and assembled to close tolerances by wrapping around the skin and bonding it to the former and to the counterweight and then joining the trailing edges as shown.

This invention is not to be limited by the embodiment shown in the drawings and described in the description, which is given by way of example and not of limitation, but only in accordance with the scope of the appended claims.

I claim:

1. A helicopter rotor blade having a longitudinal axis, an exterior airfoil configuration including an axially-extending leading edge, a top and a bottom surface, and a trailing edge, said blade comprising: a one-piece metal skin sheet bent to an airfoil shape to form the leading edge and said surfaces, the sheet having a dimension of thickness and a pair of axially extending edges; an axially extending one-piece metal former having oppositely facing walls having top and bottom surfaces extending laterally relative to the axis with respective surface configurations which are geometrically similar to the adjacent airfoil surface, said former having a uniform cross-section from end to end; retainer means integral with the former at its edge nearest to the leading edge comprising a pair of continuous flanges extending for the full length of the former, said flanges and the former forming a circularly arcuate channel, and said former having one open passage extending axially therethrough; a bonding material comprising a layer of spongy, volumetrically compressible, elastic foam and two adhesive layers, the layer of foam being sandwiched between the layers of adhesive material, one of said adhesive layers being bonded to each of said top and bottom surfaces, and the other to the skin sheet, whereby to bond the skin sheet to the former; an axially-extending one-piece metal counterweight member held by said retainer means, a wall of the counterweight member adjacent to the skin being geometrically similar to part of the leading edge of the airfoil, the skin being drawn around and against bonding material on the former and against the counterweight member and the said edges of the skin being fastened together at the trailing edge to form an axially-extending joint laterally spaced from the former, whereby to form the skin to the said airfoil configuration, the specific gravity of the material of which the counterweight member is made being greater than the material of which the former is made, whereby to shift the center of gravity of the blade toward the leading edge, ahead of where it would have been had the counterweight and the former been made of the same material, the counterweight member being a circularly sectioned rod which extends for the full length of the former.

* * * * *

UNITED STATES PATENT OFFICE
CERTIFICATE OF CORRECTION

PATENT NO. : 3,814,540
DATED : June 4, 1975
INVENTOR(S) : BUFORD J. SCHRAMM ET AL It is certified that error appears in the above-identified patent and that said Letters Patent are hereby corrected as shown below:

| | |
|---|---|
| Col. 1, line 16, | "such long" should read --such a long-- |
| Col. 1, line 45, | "cally calculated" should read --cally-calculated-- |
| Col. 1, line 62, | "oder" should read --order-- |
| Col. 3, line 5, | "ally extending" should read --ally-extending-- |
| Col. 3, line 6, | "oppositely facing" should read --oppositely-facing-- |
| Col. 3, line 27, | "its" should be capitalized |
| Col. 4, line 63, | "cold-roller" should read --cold-rolled-- |
| Col. 5, line 2 | "percent with" should read --percent of-- |
| Col. 5, line 4, | "1-11/16" should read --1-1/16-- |
| Col. 6, line 5, (Cl. 1, line 7) | "axially extending" should read --axially-extending-- |
| Col. 6, line 6, (Cl. 1, line 8) | "axially extending" should read --axially-extending-- |
| Col. 6, line 33, (Cl. 1, line 35) | "skin to the said" should read --skin to said-- |

Signed and Sealed this twenty-third Day of September 1975

[SEAL]

Attest:

RUTH C. MASON
Attesting Officer

C. MARSHALL DANN
Commissioner of Patents and Trademarks